US012264634B2

(12) United States Patent
Rodatz et al.

(10) Patent No.: US 12,264,634 B2
(45) Date of Patent: Apr. 1, 2025

(54) MONITORING THE VENTILATION OF A CRANKCASE OF AN INTERNAL COMBUSTION ENGINE

(71) Applicant: Vitesco Technologies GmbH, Regensburg (DE)

(72) Inventors: Paul Rodatz, Landshut (DE); Gerhard Haft, Maxhütte-Haidhof (DE); Michael Nienhoff, Regensburg (DE); Fabian Fink, Reichenschwand (DE)

(73) Assignee: VITESCO TECHNOLOGIES GMBH, Regensburg (DE)

(*) Notice: Subject to any disclaimer, the term of this patent is extended or adjusted under 35 U.S.C. 154(b) by 0 days.

(21) Appl. No.: 18/716,218

(22) PCT Filed: Nov. 28, 2022

(86) PCT No.: PCT/EP2022/083489
§ 371 (c)(1),
(2) Date: Jun. 4, 2024

(87) PCT Pub. No.: WO2023/104572
PCT Pub. Date: Jun. 15, 2023

(65) Prior Publication Data

US 2025/0043743 A1 Feb. 6, 2025

(30) Foreign Application Priority Data

Dec. 7, 2021 (DE) ..................... 10 2021 213 901.9

(51) Int. Cl.
*F02D 41/14* (2006.01)
*F01M 13/00* (2006.01)
*F02D 41/22* (2006.01)

(52) U.S. Cl.
CPC ......... *F02D 41/1461* (2013.01); *F01M 13/00* (2013.01); *F02D 41/22* (2013.01);
(Continued)

(58) Field of Classification Search
CPC ..... F02D 41/22; F02D 41/1461; F01M 13/00; F01M 2013/0005
See application file for complete search history.

(56) References Cited

U.S. PATENT DOCUMENTS 5,272,871 A * 12/1993 Oshima .............. B01F 25/4337 60/275
9,127,578 B2 9/2015 Pursifull
(Continued)

FOREIGN PATENT DOCUMENTS

DE 102009059662 B4 6/2011
DE 102013223656 A1 5/2014
(Continued)

OTHER PUBLICATIONS

Search Report for International Application No. PCT/EP2022/083489, 10 pages, Mar. 13, 2023.
(Continued)

*Primary Examiner* — Kevin A Lathers
(74) *Attorney, Agent, or Firm* — Slayden Grubert Beard PLLC

(57) ABSTRACT

Various embodiments include a method for monitoring the ventilation of a crankcase of an internal combustion engine with combustion chambers and a nitrogen oxide sensor arranged in an exhaust system, the sensor configured to detect an amount of nitrogen oxide in exhaust gas of the internal combustion engine. An example method includes: determining a predefined operating mode of the internal combustion engine defined by substantially no combustion of an air/fuel mixture taking place inside the combustion chambers; determining an amount of nitrogen oxide in the exhaust gas during the predefined operating mode of the internal combustion engine using the exhaust gas sensor; and identifying functional ventilation of the crankcase if the detected nitrogen oxide level exceeds a predefined nitrogen
(Continued)

oxide threshold or identifying a malfunction if the detected nitrogen oxide level is below the predefined nitrogen oxide threshold.

9 Claims, 2 Drawing Sheets

(52) U.S. Cl.
CPC ............... *F01M 2013/0005* (2013.01); *F01M 2013/0077* (2013.01)

(56) References Cited

U.S. PATENT DOCUMENTS

| | | | | |
|---|---|---|---|---|
| 11,047,329 | B2 | 6/2021 | Zhang | |
| 2010/0101514 | A1* | 4/2010 | Hirano | F01M 13/022 123/573 |
| 2011/0146391 | A1 | 6/2011 | Jach | |
| 2011/0282539 | A1 | 11/2011 | Masahiro | |
| 2014/0149015 | A1 | 5/2014 | Pursifull | |
| 2014/0202437 | A1* | 7/2014 | Surnilla | F02D 41/1456 73/114.73 |
| 2017/0051694 | A1 | 2/2017 | Tanaka | |
| 2018/0087460 | A1 | 3/2018 | Pathan | |
| 2022/0170396 | A1 | 6/2022 | Haft | |

FOREIGN PATENT DOCUMENTS

| | | | |
|---|---|---|---|
| DE | 102014218971 | A1 | 3/2015 |
| DE | 102017122057 | A1 | 3/2018 |
| DE | 102016222117 | A1 | 5/2018 |
| EP | 1900911 | B1 | 3/2008 |
| EP | 2530262 | B1 | 12/2012 |
| JP | 2006138242 | A | 6/2006 |
| JP | 2006183641 | A | 7/2006 |
| JP | 2009156239 | A | 7/2009 |
| JP | 2009174334 | A | 8/2009 |
| WO | 2021032716 | A1 | 2/2021 |

OTHER PUBLICATIONS

Search Report for DE Application No. 10 2021 213 901.9, 9 pages, Sep. 16, 2022.

* cited by examiner

MONITORING THE VENTILATION OF A CRANKCASE OF AN INTERNAL COMBUSTION ENGINE

CROSS-REFERENCE TO RELATED APPLICATIONS

This application is a U.S. National Stage Application of International Application No. PCT/EP2022/083489 filed Nov. 28, 2022, which designates the United States of America, and claims priority to DE Application No. 10 2021 213 901.9 filed Dec. 7, 2021, the contents of which are hereby incorporated by reference in their entirety.

TECHNICAL FIELD

The present disclosure relates to internal combustion engines. Various embodiments of the teachings herein include systems and/or methods for monitoring the ventilation of a crankcase of an internal combustion engine.

BACKGROUND

In the case of (piston-type) internal combustion engines comprising a closed crankcase, deviations from atmospheric pressure occur not only in the working chambers but also underneath the pistons. These result firstly from the changes in volume caused by the operating pistons and secondly from gases from the work process accumulating in the crankcase.

In internal combustion engines, blowby gases arise in the crankcase. Since the crankcase forms a closed chamber, the pressure would continuously increase without ventilation. To prevent this, the blowby gases, which contain combustion products and unburned hydrocarbons, can be discharged from the crankcase in a targeted manner. The ideal relative crankcase pressure is in the slightly negative range of approximately-2 mbar, since under these conditions, the engine does not tend to “sweat out” lubricating oil. If the negative pressure is much greater (the value is engine specific and dependent on the configuration of the sealed joints), there is a risk that air contaminated with dirt particles will be sucked in through the shaft sealing rings and seals on the crankcase. This would lead to greater wear on inner components. During the ventilation, oil droplets which are produced by rotating components are inevitably swept along out of the crankcase.

During the operation of the internal combustion engine, in particular during overrun cut-off phases of the internal combustion engine, by means of a high pressure in the intake pipe, at least some of the gases trapped in the crankcase can also go past the piston again into the combustion chambers and thus reach the exhaust system. The vent line can block or tear, or the connection to the exhaust system can be missing. As a result, the ventilation is limited, and contaminants from the crankcase can be released into the environment. Therefore, the proper functionality of the crankcase ventilation should be monitored.

DE 10 2014 218 971 A1 describes a method and systems for detecting moisture and crankcase ventilation by means of an exhaust gas sensor. In this case, during selected conditions, when fuel is not applied to the internal combustion engine, the exhaust gas sensor (such as a linear lambda sensor, a HC or CO sensor or a NOx sensor) can be used to estimate the moisture and/or to estimate the ventilation of the crankcase (crankcase ventilation hydrocarbons (PCV hydrocarbons)).

Further prior art includes U.S. Pat. No. 11,047,329 B2, JP 2009/174334 A, JP 2006/183641 A and U.S. Pat. No. 9,127,578 B2.

SUMMARY

The present disclosure includes teachings useful for determining and checking the proper functionality of a crankcase ventilation of an internal combustion engine in a simple and cost-effective manner. For example, some embodiments of the teachings herein include a method for monitoring the ventilation of a crankcase (120) of an internal combustion engine (100) which comprises combustion chambers (110) and a nitrogen oxide sensor (140) arranged in an exhaust system (130) of the internal combustion engine (100), which sensor is configured to detect the amount of nitrogen oxide in the exhaust gas of the internal combustion engine (100), wherein the method comprises: determining a predefined operating mode of the internal combustion engine (100) during which substantially no combustion of an air/fuel mixture takes places inside the combustion chambers (110), determining an amount of nitrogen oxide in the exhaust gas of the internal combustion engine (100) during the predefined operating mode of the internal combustion engine (100) by means of the exhaust gas sensor (140), and determining that the ventilation of the crankcase (120) is functional when the nitrogen oxide level detected during the predefined operating mode of the internal combustion engine (100) exceeds a predefined nitrogen oxide threshold.

In some embodiments, the nitrogen oxide level is determined after a predefined duration has elapsed, after the predefined operating mode of the internal combustion engine has been detected.

In some embodiments, the predefined duration is approximately 5 seconds, or approximately 3 seconds.

In some embodiments, the predefined operating mode of the internal combustion engine (100) comprises an overrun cut-off phase of the internal combustion engine (100).

In some embodiments, the method further comprises determining that the ventilation of the crankcase (120) is malfunctioning when the nitrogen oxide level determined during the predefined operating mode of the internal combustion engine (100) falls below the predefined nitrogen oxide threshold.

In some embodiments, the method further comprises issuing a warning to the operator of the internal combustion engine (100) when it has been determined that the ventilation of the crankcase (120) is malfunctioning.

In some embodiments, the predefined nitrogen oxide threshold is between approximately 5 ppm and approximately 20 ppm.

As another example, some embodiments include an internal combustion engine (100) comprising: at least one combustion chamber (110) which is formed by a reciprocating piston (114) inside a cylinder (112), a crankcase (120) in which the piston (114) is arranged at least in part and which is fluidically connected at least in part to the combustion chamber (110) by means of a gap between the piston (114) and the cylinder (112), an exhaust system (130) which is fluidically connected to the at least one combustion chamber (110), a nitrogen oxide sensor (140) which is arranged in the exhaust system (130) and is configured to detect the amount of nitrogen oxide in the exhaust gas of the internal combustion engine (100), and a control unit (160) which is configured to carry out one or more of the methods for monitoring the ventilation of the crankcase (120) described herein.

In some embodiments, the internal combustion engine further comprises a catalytic converter (150) arranged downstream of the nitrogen oxide sensor (140).

In some embodiments, the internal combustion engine (100) further comprises: an intake pipe (102) which is fluidically connected to the at least one combustion chamber (110) and is configured to supply air for the combustion of an air/fuel mixture to the at least one combustion chamber (110), and a vent line (124) which fluidically connects the crankcase (120) to the intake pipe (102).

BRIEF DESCRIPTION OF THE DRAWINGS

Further features and objects of the teachings herein are apparent to a person skilled in the art by putting the present teaching into practice and taking into consideration the accompanying drawings, in which.

DETAILED DESCRIPTION

Figure 1:
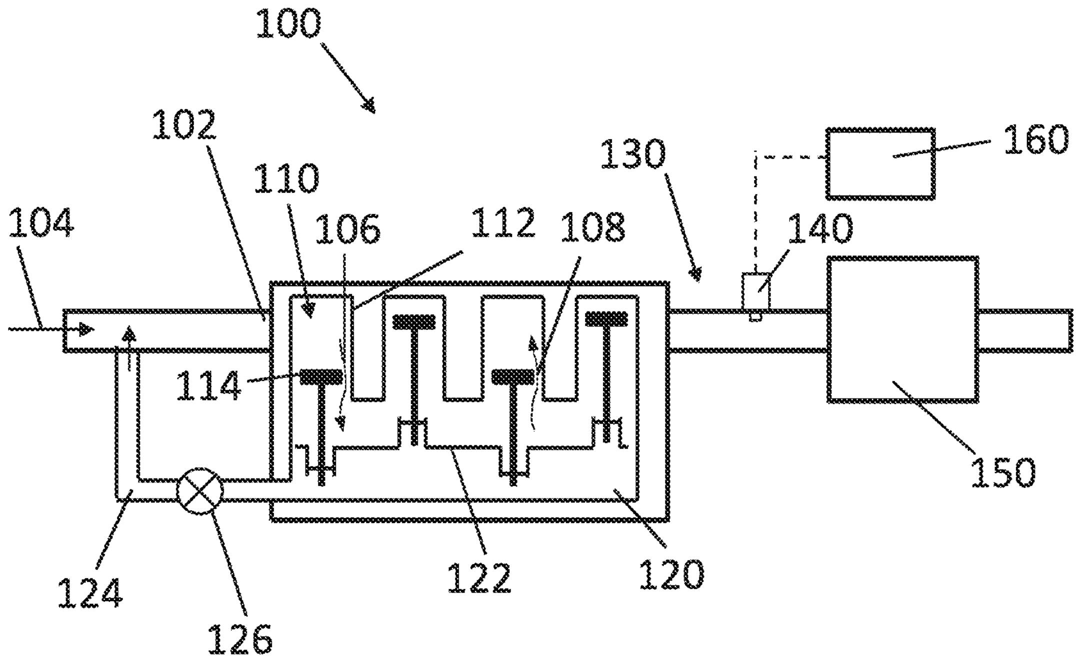
FIG. 1 shows a schematic view of an internal combustion engine of a vehicle incorporating teachings of the present disclosure.

The present disclosure describes, among other things, monitoring the crankcase ventilation by means of a nitrogen oxide sensor provided in the exhaust system of the internal combustion engine during predefined operating modes during which no combustion of an air/fuel mixture takes place in the combustion chambers of the internal combustion engine. In particular during the above-mentioned predefined operating modes, the exhaust gases trapped in the crankcase go back into the combustion chambers and thus the exhaust system via the vent line, and/or as what are known as blowby gases and can thus be detected by the nitrogen oxide sensor arranged in the exhaust system.

When the nitrogen oxide sensor already arranged and present in the exhaust system indicates an amount of nitrogen oxide which is above a predefined threshold during the predefined operating modes of the internal combustion engine, it can be concluded that the crankcase ventilation is functioning properly, since the ventilation path out of the crankcase into the combustion chambers and thus into the exhaust system is clear and unblocked. However, if, during these predefined operating modes of the internal combustion engine, the exhaust gas sensor indicates an amount of exhaust gas which is below the predefined threshold, it can be concluded that the crankcase ventilation is functioning improperly. In particular, it can then be established that the ventilation path out of the crankcase into the exhaust system is blocked or clogged at least in part.

Consequently, some embodiments of the teachings herein include a method for monitoring the ventilation of a crankcase of an internal combustion engine which comprises a nitrogen oxide sensor arranged in an exhaust system of the internal combustion engine, which sensor is configured to detect the amount of nitrogen oxide in the exhaust gas of the internal combustion engine. In this case, the method comprises determining a predefined operating mode of the internal combustion engine during which substantially no combustion of an air/fuel mixture takes place in a combustion chamber, determining an amount of nitrogen oxide in the exhaust gas of the internal combustion engine during the predefined operating mode of the internal combustion engine by means of the nitrogen oxide sensor, and determining that the ventilation of the crankcase is functional when the nitrogen oxide level determined during the predefined operating mode of the internal combustion engine exceeds a predefined nitrogen oxide threshold. It is consequently provided that, during the predefined operating mode, such as an overrun cut-off phase of the internal combustion engine, it can be concluded that the ventilation of the crankcase is functional when a significant amount of nitrogen oxide is still detected at the location of the exhaust gas sensor.

In some embodiments, the nitrogen oxide level is determined after a predefined duration has elapsed, after the predefined operating mode of the internal combustion engine has been determined. It can thus be ensured for example that the exhaust gases generated during the combustion of the air/fuel mixture in the combustion chambers have been completely discharged from the combustion chambers and have already flowed past the nitrogen oxide sensor so that during the predefined operating mode, the exhaust gas measured by the nitrogen oxide sensor must come from the crankcase. Preferably, the predefined duration is approximately 5 seconds, preferably approximately 3 seconds.

In some embodiments, the nitrogen oxide level may be determined only once an air mass integral in the exhaust system exceeds a predefined air mass integral threshold. In particular, the time until the nitrogen oxide sensor can measure the exhaust gases coming from the crankcase is dependent on the mass flow rate and on the volume of the exhaust system. Consequently, in an alternative configuration of this type, it may be advantageous to determine the nitrogen oxide level only when the air mass integral in the exhaust system exceeds the predefined air mass integral threshold. Moreover, the nitrogen oxide sensor requires a certain amount of time to settle on the nitrogen oxide measurement.

In some embodiments, the predefined operating mode of the internal combustion engine comprises an overrun cut-off phase of the internal combustion engine. In some embodiments, this is an overrun cut-off phase which immediately follows a high-load operation of the internal combustion engine. In particular, the amount of nitrogen oxide, i.e. the amount of what is known as blowby gas, in the crankcase is greater the higher the load of the internal combustion engine is. Accordingly, it may be advantageous to diagnose the crankcase ventilation during an overrun cut-off phase which immediately follows a high-load operation of the internal combustion engine.

In some embodiments, the method further comprises determining that the ventilation of the crankcase is malfunctioning when the nitrogen oxide level determined during the predefined operating mode of the internal combustion engine falls below the predefined nitrogen oxide threshold. For example, it can then be stated that the crankcase ventilation is blocked or clogged at least in part or in some portions and consequently, the crankcase ventilation can no longer take place properly.

In some embodiments, the method further comprises issuing a warning to the operator of the internal combustion engine when it has been determined that the ventilation of the crankcase is malfunctioning. In some embodiments, the predefined nitrogen oxide threshold is between approximately 5 ppm [ppm=parts per million] and approximately 20 ppm. In some embodiments, the predefined nitrogen oxide threshold can be selected according to the previous load of the internal combustion engine.

In some embodiments, an internal combustion engine includes a reciprocating piston inside a cylinder, a crankcase in which the piston is arranged at least in part and which is fluidically connected at least in part to the combustion chamber by means of a gap between the piston and the cylinder, an exhaust system which is fluidically connected to the at least one combustion chamber, a nitrogen oxide sensor which is arranged in the exhaust system and is configured to detect the amount of nitrogen oxide in the exhaust gas of the internal combustion engine and comprises a control unit configured to carry out one or more of the methods for monitoring the ventilation of the crankcase described herein.

In some embodiments, the internal combustion engine further comprises a catalytic converter arranged downstream of the nitrogen oxide sensor for subsequently treating the exhaust gas.

In some embodiments, the internal combustion engine further comprises an intake pipe which is fluidically connected to the at least one combustion chamber and is configured to supply air to the at least one combustion chamber for the combustion of an air/fuel mixture, and a vent line which fluidically connects the crankcase to the intake pipe.

FIG. 1 shows a schematic view of an example internal combustion engine 100 of a vehicle incorporating teachings of the present disclosure. The internal combustion engine 100 comprises an intake pipe (or air inlet duct) 102 and combustion chambers 110 connected thereto (in FIG. 1, only one of the four combustion chambers 110 provided with reference signs). By means of the intake pipe 102, intake air can enter the combustion chambers 110, where the intake air can be mixed with fuel and combusted in a known manner. The flow direction of the intake air is labelled with the arrow 104.

The combustion chambers 110 are formed by cylinders 112 and pistons 114 reciprocating therein, as a result of which the volume of the combustion chambers 110 can change over time. The pistons 114 are arranged at least in part in a crankcase 120 and are mechanically coupled to a crankshaft 122 arranged therein, which is known from the prior art.

The combustion chambers 110 are fluidically connected to an exhaust system 130, by means of which the exhaust gases, which are generated by combustion of the air/fuel mixture in the combustion chambers 110, can be discharged into the environment after subsequent treatment. In this case, the exhaust system 130 describes merely the portion of the internal combustion engine 100 which is configured exclusively to discharge the exhaust gases.

Arranged in the exhaust system 130, there is a nitrogen oxide sensor 140 and a catalytic converter 150 arranged downstream of the nitrogen oxide sensor 140, which catalytic converter is configured to subsequently treat the exhaust gases. The nitrogen oxide sensor 140 is configured to determine the amount of nitrogen oxide in the exhaust gas at the location downstream of the combustion chambers 110. A control unit 160 is in communication with the nitrogen oxide sensor 140 and is configured to receive the nitrogen oxide levels detected by the nitrogen oxide sensor 140 and to control the operation of the internal combustion engine 100 at least in part.

During the operation of the internal combustion engine 100, deviations from atmospheric pressure arise not only in the combustion chambers 110, but also under the pistons 114. These result firstly from the changes in volume caused by the operating pistons 114 and secondly from exhaust gases from the work process accumulating in the crankcase 120. In particular, exhaust gases from the combustion chambers 110 can enter the crankcase 120 through a gap between cylinders 112 and pistons 114, which crankcase is indicated by an arrow 106 in FIG. 1.

So that blowby gases are not discharged into the atmosphere untreated, a vent line 124 fluidically connects the crankcase 120 to the intake pipe 102. In the vent line 124, a control valve 126 is provided, by which the ventilation of the crankcase 120 into the intake pipe 102 can be controlled. The control valve 126 may be a pressure control valve which can automatically control the pressure inside the crankcase 120 in an open-loop or closed-loop manner. In some embodiments, the pressure in the crankcase 120 can be adjusted by means of a mechanical regulating valve (not shown in FIG. 1) in the intake pipe 102. In particular, the exhaust gases accumulated in the crankcase 120 can be supplied to the combustion chambers 110 in later work cycles and can thus also be supplied to the exhaust system 130, where said exhaust gases can be subsequently treated by means of the catalytic converter device 150.

According to the exemplary embodiment shown in FIG. 1, the blowby gases are taken into the intake pipe 102 via the vent line 124. As a result of the negative pressure in the intake pipe 124, a negative pressure also arises in the crankcase 120 in most operating states of the internal combustion engine 100. In the case of supercharged internal combustion engines 100, the intake can take place in front of the turbocharger. The exhaust gases from the crankcase 120 are also sucked in thereby.

With additional reference to FIG. 2, in the following, an exemplary configuration of an example method for monitoring the crankcase ventilation of the internal combustion engine 100 from FIG. 1 incorporating teachings of the present disclosure is described.

Figure 2:
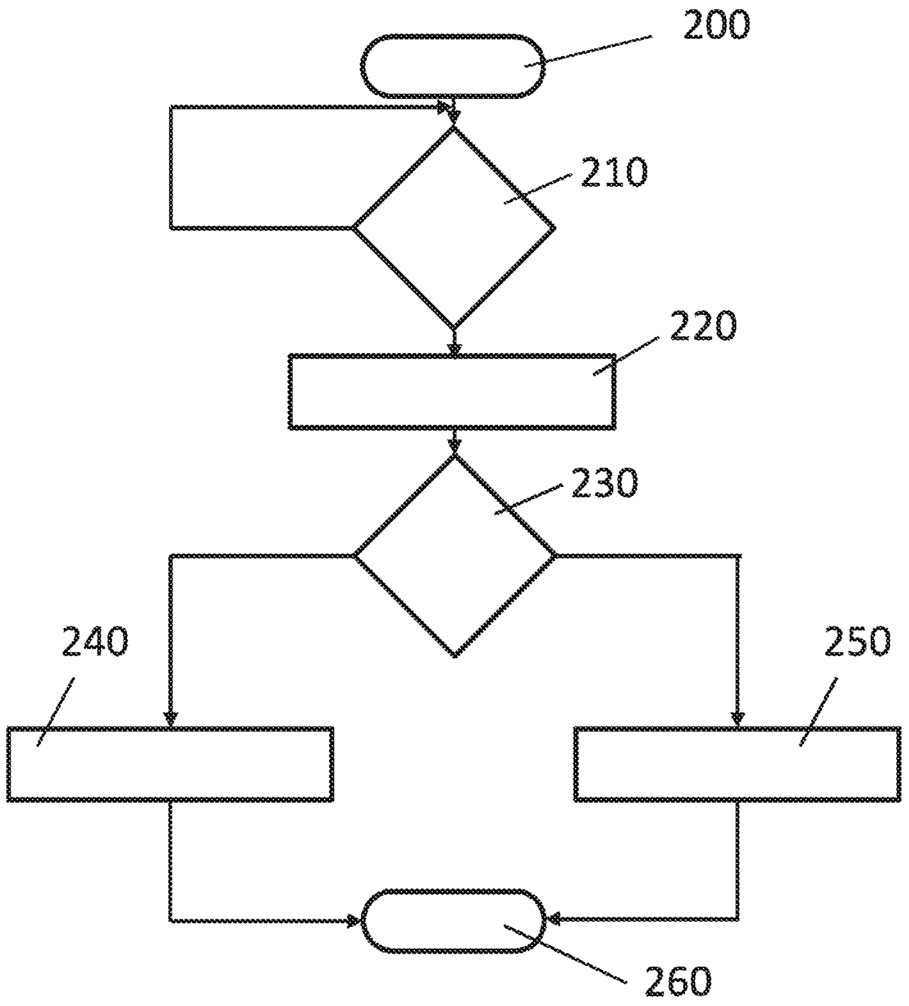
FIG. 2 shows an exemplary flow diagram of an example method for monitoring the ventilation of the crankcase of the internal combustion engine from FIG. 1, incorporating teachings of the present disclosure.

The method from FIG. 2 starts at step 200 and then reaches step 210, in which it is determined whether the internal combustion engine 100 is in a predefined operating mode, during which no combustion of an air/fuel mixture takes place inside the combustion chambers 110. By way of example, there can be a predefined operating mode in the form of an overrun cut-off phase of the internal combustion engine 100. The method remains in step 210 until a predefined operating mode is detected.

If a predefined operating mode of the internal combustion engine 100 is detected during step 210, the method reaches step 220, in which a nitrogen oxide level is detected by means of the nitrogen oxide sensor 140. In a subsequent step 230, it is detected whether the nitrogen oxide level detected during step 220 exceeds a predefined nitrogen oxide threshold, e.g. 50 ppm.

In some embodiments, after detecting the predefined operating mode of the internal combustion engine 100, a predefined duration of approximately 3 seconds, or approximately 1 second, is allowed to elapse before step 220 is carried out. It can thus be ensured that, at the time of the nitrogen oxide measurement, the exhaust gases generated as a result of the combustion which has previously taken place in the combustion chambers 110 have already flowed past the nitrogen oxide sensor 140. Consequently, the exhaust gas being measured in step 220 should be the exhaust gas ventilated out of the crankcase 120.

If it is determined in step 230 that the nitrogen oxide level detected in step 220 exceeds the predefined nitrogen oxide threshold, the method reaches step 240, in which the proper functionality of the crankcase ventilation is diagnosed before the method ends at step 260. In particular, it is possible to configure the method in such a way that, when the predefined nitrogen oxide threshold is exceeded, the exhaust gases trapped in the crankcase 120 can flow either through the vent line 124 or past the piston 114 (i.e. along the arrow 108 in FIG. 1) into the combustion chambers 110 and thus into the exhaust system 130. These two ventilation paths are thus substantially unblocked and substantially clear.

However, if it is determined in step 230 that the nitrogen oxide level determined in step 220 does not exceed, i.e. falls below, the predefined nitrogen oxide threshold, the method reaches step 250, in which the crankcase ventilation is diagnosed as functioning improperly or malfunctioning before the method ends again at step 260. In particular, it is possible to configure the method in such a way that, when the predefined nitrogen oxide threshold is fallen below, the exhaust gases trapped in the crankcase 120 cannot flow as desired through the vent line 124 or past the piston 114 (i.e. along the arrow 108 in FIG. 1) into the combustion chambers 110 and thus into the exhaust system 130. Thus at least one of these two ventilation paths is blocked or clogged at least in part, for example by soot particles, a defective oil separator, a crushed line or a clogged intake air filter.

By means of the methods described herein, it is thus possible to monitor whether one of the above-mentioned ventilation paths which lead out of the crankcase 120 into the exhaust system 130 is substantially clear or is blocked at least in part. This monitoring can take place in a simple manner using the nitrogen oxide sensor 140 which is already arranged in the exhaust system 130.

What is claimed is:

1. A method for monitoring the ventilation of a crankcase of an internal combustion engine with combustion chambers and a nitrogen oxide sensor arranged in an exhaust system, the sensor configured to detect an amount of nitrogen oxide in exhaust gas of the internal combustion engine, the method comprising:

determining a predefined operating mode of the internal combustion engine defined by substantially no combustion of an air/fuel mixture taking place inside the combustion chambers;

determining an amount of nitrogen oxide in the exhaust gas during the predefined operating mode of the internal combustion engine using the exhaust gas sensor; and identifying functional ventilation of the crankcase if the detected nitrogen oxide level exceeds a predefined nitrogen oxide threshold or identifying a malfunction if the detected nitrogen oxide level is below the predefined nitrogen oxide threshold.

2. The method as claimed in claim 1, wherein determining the nitrogen oxide level takes place after a predefined duration of time after the predefined operating mode of the internal combustion engine has been detected elapses.

3. The method as claimed in claim 2, wherein the predefined duration is approximately 5 seconds.

4. The method as claimed in claim 1, wherein the predefined operating mode of the internal combustion engine comprises an overrun cut-off phase of the internal combustion engine.

5. The method as claimed in claim 1, further comprising issuing a warning to the operator of the internal combustion engine if it is determined that the ventilation of the crankcase is malfunctioning.

6. The method as claimed in claim 1, wherein the predefined nitrogen oxide threshold is between approximately 5 ppm and approximately 20 ppm.

7. An internal combustion engine comprising:

a combustion chamber with a reciprocating piston inside a cylinder;

a crankcase in which the piston is arranged at least in part and fluidically connected to the combustion chamber by a gap between the piston and the cylinder;

an exhaust system fluidically connected to the combustion chamber;

a nitrogen oxide sensor to arranged in the exhaust system and configured to detect an amount of nitrogen oxide in exhaust gas of the internal combustion engine; and a control unit configured to determine a predefined operating mode of the internal combustion engine defined by substantially no combustion of an air/fuel mixture taking place inside the combustion chambers;

determine an amount of nitrogen oxide in the exhaust gas during the predefined operating mode of the internal combustion engine using the exhaust gas sensor; and identify functional ventilation of the crankcase if the detected nitrogen oxide level exceeds a predefined nitrogen oxide threshold or identifying a malfunction if the detected nitrogen oxide level is below the predefined nitrogen oxide threshold.

8. The internal combustion engine as claimed in claim 7, further comprising a catalytic converter arranged downstream of the nitrogen oxide sensor.

9. The internal combustion engine as claimed in claim 7, further comprising:

an intake pipe fluidically connected to the combustion chamber and configured to supply air for combustion of an air/fuel mixture to the combustion chamber; and a vent line fluidically connecting the crankcase to the intake pipe.

* * * * *